United States Patent
Bellare et al.

(10) Patent No.: US 7,584,118 B1
(45) Date of Patent: Sep. 1, 2009

(54) METHODS AND SYSTEMS FOR ELECTRONIC AFFILIATE COMPENSATION

(75) Inventors: Kiran Bellare, San Jose, CA (US); Michele Monclova Father, San Francisco, CA (US); Jean-Christophe Meriaux, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1220 days.

(21) Appl. No.: 09/888,850

(22) Filed: Jun. 25, 2001

(51) Int. Cl.
*G06Q 30/00* (2006.01)
(52) U.S. Cl. .................................................. 705/14
(58) Field of Classification Search ................ 705/14
See application file for complete search history.

(56) References Cited

U.S. PATENT DOCUMENTS

| | | | | |
|---|---|---|---|---|
| 6,029,141 | A * | 2/2000 | Bezos et al. | 705/27 |
| 6,289,318 | B1 * | 9/2001 | Barber | 705/14 |
| 6,401,079 | B1 * | 6/2002 | Kahn et al. | 705/30 |
| 2001/0037205 | A1 * | 11/2001 | Joao | 705/1 |
| 2002/0038255 | A1 * | 3/2002 | Tarvydas et al. | 705/26 |
| 2004/0039640 | A1 * | 2/2004 | Koppelman et al. | 705/14 |
| 2004/0225558 | A1 * | 11/2004 | Lipin | 705/14 |

OTHER PUBLICATIONS

Notess, Greg, "Intricacies of advertisement information on the Web", Online, Nov. 1999, vol. 23, Issue 6, p. 79-81.*

* cited by examiner

*Primary Examiner*—Eric W. Stamber
*Assistant Examiner*—Michael Bekerman
(74) *Attorney, Agent, or Firm*—Townsend & Townsend & Crew LLP

(57) ABSTRACT

A method for determining the compensation due an affiliate from a merchant for traffic to a merchant Web site that originates from an affiliate Web site. The method may include steps of defining a plurality of compensation plans, exposing one or more of the plurality of compensation plans to the affiliate, the selected compensation plan(s) exposed to the affiliate being tailored to the affiliate and/or a product or service offered by the merchant; accepting a selection of compensation plans by the affiliate, and measuring traffic to the merchant Web site that originates from the affiliate Web site and applying the measured traffic to the compensation plan(s) selected by the affiliate to determine the compensation due to the affiliate.

70 Claims, 3 Drawing Sheets

METHODS AND SYSTEMS FOR ELECTRONIC AFFILIATE COMPENSATION

BACKGROUND OF THE INVENTION

1. Field of the Invention

The present invention relates generally to methods and systems for compensating electronic affiliates. More particularly, the present invention relates to methods and systems to provide affiliates with strategic incentives that match the merchant's own sales and marketing goals.

2. Description of the Related Art

To increase the volume of shoppers visiting a given World Wide Web (hereafter "Web") site, it is helpful to establish a strong brand identity, to develop customer loyalty and to establish a pervasive site presence. One of the ways that Web merchants have found to draw traffic to their sites is to enlist the aid of other Web sites, called affiliate sites. The affiliate agrees to represent the merchant's products or services on their Web site in exchange for compensation. The merchants engage in this business relationship in order to broaden their reach on the Internet and to sell more products and/or services. Indeed, affiliate sites may be considered as a "virtual sales force", as they constitute in inexpensive venue in which to showcase and promote the goods and/or services offered by the merchant Web site. The merchant site, however, is not responsible for the financial safety of the affiliate. Indeed, the agreement between the merchant and the affiliate may specify that the affiliate receives no compensation unless specified actions occur. In addition, an affiliate may be an affiliate for more than one Web merchant. Affiliate sites are typically complementary and approved Web sites that offer a link back to the Web merchant's site. The link may point to the Web merchant's home page or may "deep link" to a Web page featuring a specific product and/or service within the Web merchant's Web site. Such affiliates are commonly used in the eCommerce industry to market products, generate new customers and to generate sales. In return, the affiliate is compensated, typically on the basis of orders generated by customers who "click through" the link to the merchant's Web site and purchase a product and/or service therein. Currently, it is believed that the industry employs a rather simplistic compensation scheme to determine the affiliate's compensation, which scheme is believed to be assigned to the affiliate and based upon a percentage of the sales generated through the affiliate site.

However, such a compensation scheme constrains the choices available to the affiliate and fails to provide any opportunity for the affiliate to maximize their compensation, other than blindly increasing the traffic to the merchant site. More particularly, conventional compensation schemes do not allow the merchant to create or manage incentives for the affiliate to sell the optimal product to the optimal customer at the optimal time. Indeed, conventional affiliate compensation schemes do not allow the merchant or the affiliate to skew sales to products with excess inventory, to enlist the aid of affiliates in deploying marketing campaigns for specific goods or services or to create customized and differentiated compensation plans to avoid conflicts between competing affiliates.

What are needed, therefore, are methods and systems for compensating affiliates that are more flexible, provide incentives to the affiliate to sell targeted products and/or services and to generally align the affiliates' compensation and interests to the merchant's strategic sales and marketing objectives. In effect, what are needed are methods and systems for compensating affiliates that transforms the participating affiliates into de facto strategic partners with the Web merchant.

SUMMARY OF THE INVENTION

Accordingly, the present invention may be regarded as a method for determining the compensation due an affiliate from a merchant for traffic to a merchant Web site that originates from an affiliate Web site. The method may include steps of defining a plurality of compensation plans; exposing one or more of the plurality of compensation plans to the affiliate, the selected compensation plan(s) exposed to the affiliate being tailored to the affiliate and/or a product or service offered by the merchant; accepting a selection of compensation plans by the affiliate, and measuring traffic to the merchant Web site that originates from the affiliate Web site and applying the measured traffic to the compensation plan(s) selected by the affiliate to determine the compensation due to the affiliate.

The plurality of compensation plans may include a compensation plan in which the compensation due the affiliate varies according to a predetermined date interval. The plurality of compensation plans may include a compensation plan in which the affiliate is compensated according to a first percentage rate of a predetermined measure until a first threshold quantity of the measure is reached and in which the affiliate is thereafter compensated according to a second percentage rate of the predetermined measure. The second percentage rate may be applied retroactively to compensate the affiliate according to the second percentage rate of the measure for the traffic to the Merchant Web site prior to reaching the first threshold quantity of the measure. The method may further include a step of defining a plurality of product categories and the plurality of compensation plans may include a compensation plan in which the compensation due to the affiliate varies according to the defined product categories. The traffic to the merchant Web site may be measured according to one or more predetermined measures, the predetermined measure(s) being selected from a group including generated revenue, number of orders, number of new customers, number of returning customers and click throughs, for example. The compensation due to the affiliate may be determined according to a fixed value and/or a percentage of the predetermined measure(s). This percentage may be fixed or variable. The compensating step may compensate the affiliate in the currency preferred by the affiliate. The compensation due to the affiliate may include a bonus that is awarded after a threshold quantity of the predetermined measure(s) is reached. The compensation due the affiliate may include non-monetary credits, a magnitude of which may be determined by the selected compensation plan(s). The non-monetary credits may be chosen from among a group including travel miles, store credits and points redeemable for products and/or services, for example. The method may also include steps of assigning a performance goal to the affiliate, and periodically comparing the performance of the affiliate against the performance goal assigned to the affiliate. The performance of the affiliate may be measured according to the traffic to the merchant Web site that originates from the affiliate Web site. The measuring step may be carried out over a selectable interval that may be independent of an accounting calendar (such as the merchant's accounting calendar, for example). The compensation plan(s) selected by the affiliate may be overridden by the merchant. The method may also include a step of assigning one or more compensation plans to a sub-affiliate recruited by the affiliate, the affiliate being further compensated based upon traffic to the merchant Web site originating from the sub-affiliate's Web site. The method may also include a step of paying the affiliate based upon the determined compensation, the paying step being carried out according to a pay calendar that is selectable by the merchant. Steps of making the affiliate a member of a pay group, assigning a pay calendar to the pay group, and paying the plurality of members of the pay group according to the assigned pay calendar may also be carried out. A step of assigning a default compensation plan to the affiliate may also be carried out. Prior to the exposing step, the method may include the steps of: receiving an application from a potential affiliate and declining the potential affiliate or accepting the potential affiliate as an affiliate based upon an evaluation of the received application; registering a potential affiliate as an affiliate upon completing a registration procedure, and acknowledging the affiliate upon receipt of predetermined authentication information.

The method may also include a step of profiling the affiliate for future customized compensation plans based upon the traffic to the merchant Web site that originates from the affiliate Web site or the determined compensation. The traffic measuring step also may include a step of measuring traffic to the merchant Web site that originates from a site other than the affiliate Web site but whose first visit to the merchant Web site originated from the affiliate Web site. The method may also include a step of receiving customer information from the affiliate, the received customer information (including, for example, customer authentication and payment instrument information) being sufficient for executing a customer purchase request at the merchant web site. The method may also include a step of setting up one or more links to the merchant Web site on the affiliate Web site, the link(s) being associated with the at least one selected compensation plan selected by the affiliate. The defining step preferably defines compensation plans that implement a sales strategy of the merchant. A step of maintaining a plurality of mass affiliates compensated by compensation plans that differ from the defined plurality of compensation plans may also be carried out, the mass affiliates being managed by a third party.

The present invention is also a method for an affiliate to earn compensation from a merchant for traffic to a merchant Web site that originates from an affiliate Web site, the affiliate performing the steps of: accessing the merchant Web site; reviewing a plurality of compensation plans exposed to the affiliate at the merchant Web site and selecting one or more of the plurality of compensation plans, each of the compensation plans having a link to the merchant Web site associated therewith; providing one or more links to the merchant Web site on the affiliate Web site, the link(s) being associated with the selected compensation plan(s), and receiving compensation from the merchant according to the selected compensation plan(s) and the traffic to the merchant Web site that originates from the link(s) on the affiliate Web site.

The present invention may also be viewed as a computer system configured for determining the compensation due an affiliate from a merchant for traffic to a merchant Web site that originates from an affiliate Web site. The computer system may include one or more processor; one or more storage devices and a plurality of processes spawned by said at least one processor. The processes may include processing logic for defining a plurality of compensation plans; exposing at least one selected compensation plan of the plurality of compensation plans to the affiliate, the selected compensation plan exposed to the affiliate being tailored to the affiliate and/or a product or service offered by the merchant; accepting a selection by the affiliate of one or more of the selected compensation plans, and measuring traffic to the merchant Web site that originates from the affiliate Web site and applying the measured traffic to the at least one compensation plan selected by the affiliate to determine the compensation due to the affiliate.

BRIEF DESCRIPTION OF THE DRAWINGS

For a further understanding of the objects and advantages of the present invention, reference should be had to the following detailed description, taken in conjunction with the accompanying figures, wherein.

DESCRIPTION OF THE INVENTION

Functional Description

Figure 1:
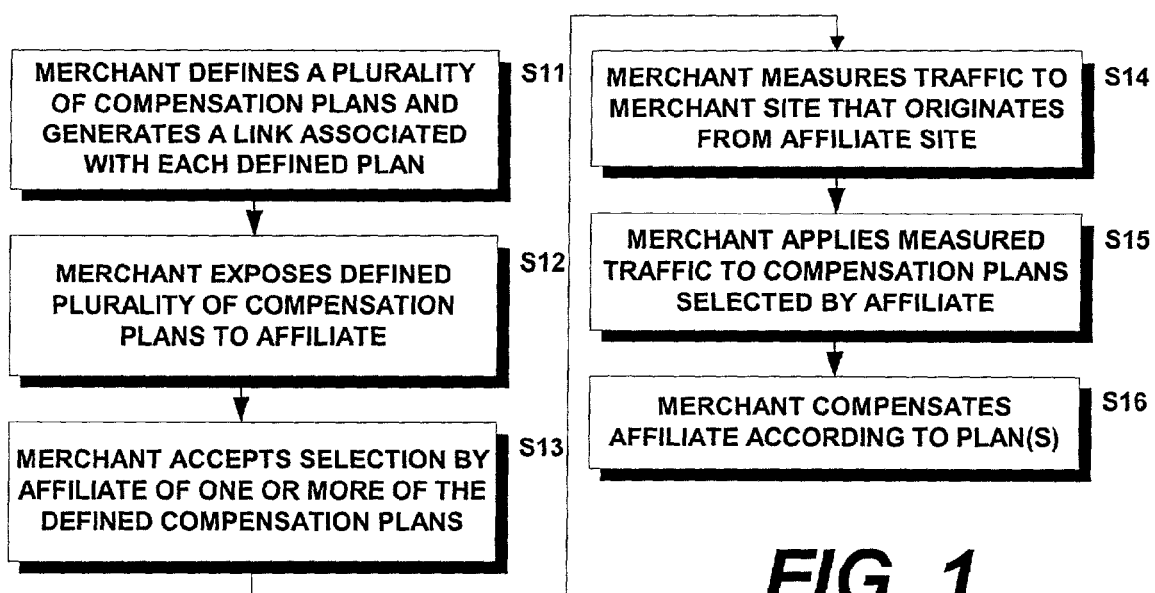
FIG. 1 is a flowchart of an embodiment of the present method for determining the compensation due an affiliate from a merchant for traffic to the merchant's Web site that originates from the affiliate's Web site.

The present invention is a method for determining the compensation due an affiliate from a merchant for traffic to a merchant Web site that originates from an affiliate Web site. The present invention is drawn primarily toward strategic affiliates, as distinguished from mass affiliates. Mass affiliates are traditionally managed by third parties, which then constitute an intermediary between the merchant and the affiliate. Such mass affiliates are easy to set up and maintain and typically generate a relatively low volume of sales for the Web merchant. Moreover, such mass affiliates are most often encountered in the business to consumer realm. The present invention, although not exclusive of such business to consumer relationships, finds particular advantage in business-to-business relationships, in which the affiliate is seen as a strategic partner to the merchant. As such, the relationship is cooperatively managed directly between the parties at interest; namely, the merchant and the affiliate. This strategic relationship, according to the present invention, is developed by providing the affiliate with incentives crafted to align the sales and/or marketing goals of the affiliate with those of the merchant. That is, the merchant, according to the present invention, may present the affiliate with a choice of compensation plans that are customized to the affiliate. Moreover, each of the compensation plans exposed to the affiliate on the merchant's site advantageously implements all or a portion of the merchant's overall sales strategy. The affiliate may then select one or more of the compensation plans offered by the merchant and paste a link to the merchant's Web site or directly to any products and/or services featured on the merchant's Web site. By judiciously choosing one or more of the compensation plans offered, the affiliate may maximize their profits by steering traffic to the merchant site and promoting the merchant's products and/or services that will return the highest compensation, all the while implementing the merchant's own sales strategy. Both parties, in this manner, act in their own self-interest and are provided with an incentive to continue and expand the scope of the relationship. As one or more of the compensation plans may be customized to one or a plurality of affiliates, each affiliate may be given a different choice of compensation plans from which to choose. In this manner, competing affiliates may be given choices of compensation plans that do not result in conflicts for any of the involved parties.

According to the present invention, the traffic to the merchant site that originates from the affiliate site may be measured according to one or more predetermined measures. The measure(s) may include revenue generated from traffic originating from the affiliate Web site, number of orders originating from the affiliate Web site, number of new customers attributable to the affiliate Web site, number of returning customers from the affiliate Web site and click throughs, for example.

FIG. 1 is a flowchart of an embodiment of the present method for determining the compensation due an affiliate from traffic to the merchant's Web site that originates from the affiliate's Web site, as considered from the merchant's point of view. As shown therein, step S11 calls for the merchant to define a plurality of compensation plans and to generate a link associated with each defined compensation plan. The generated link may include text, graphics and/or hypertextual information, such as a Universal Resource Locator (URL) pointing to the merchant's Web site or to a specific product, service or page within the merchant's Web site. This link may be pasted onto the affiliate's Web site to encourage customers to click thereon and visit the merchant's Web site. Of these defined compensation plans, the merchant may choose to cause one or more (or all) of these to be exposed (i.e., visible) to the affiliate as available choices of compensation plans, as outlined at S12. Indeed, although the merchant may have defined many compensation plans, only a predetermined subset of these may be appropriate for any given affiliate or potential affiliate, based upon the affiliate's profile and/or other considerations. The affiliate may then select one or more of the compensation plans, which selected compensation plans may be accepted by the merchant, as shown at S13. Thereafter, the merchant measures the traffic to the merchant site that originated from the affiliate site, as shown at S14. This measuring step may be carried out according to the merchant's accounting calendar or over a selectable interval that is independent of the merchant's accounting calendar. This may help the merchant in spreading out payments to its affiliates over an extended period of time. As shown at S15, the merchant may then, at predetermined times or intervals, apply the measured traffic to the compensation plans selected by the affiliate and compensate the affiliate as determined by the measured traffic and the selected compensation plans, as shown at S16. The compensation plan or plans selected by the affiliate may be overridden by the merchant, if needed. In addition, each affiliate may be assigned a default compensation plan that is effective in determining the affiliate's compensation should the affiliate choose not select any of the exposed compensation plans.

The compensation plans, according to the present invention, may be static or dynamic, fixed or variable, based upon sales or any other measure and may be effective for an indeterminate or finite period. For example, the compensation plan or plans exposed to the affiliate and available for the selection by the affiliate may include a compensation plan in which the compensation due the affiliate varies according to a predetermined date interval. For example, the compensation may be based upon a first percentage of sales (7%, for example) during the summer months and another percentage of sales (5%, for example) during the Christmas season or toward the end of the merchant's fiscal quarter or year, for example. Similarly, the compensation plans exposed to the affiliate may include a compensation plan in which the affiliate is compensated according to a first percentage rate of a predetermined measure until a first threshold quantity of the measure is reached and thereafter the affiliate is compensated according to a second percentage rate of the predetermined measure (and/or of another measure). Such a compensation plan may reward affiliates that generate a great deal of traffic to the merchant site by increasing the affiliate's compensation after reaching a predetermined threshold of a particular measure. For example, the merchant may compensate the affiliate at the rate of 5% (the first percentage) of sales (the predetermined measure) generated up to $100,000 (the threshold quantity) over a predetermined period and thereafter compensate the affiliate at the rate of 7% (the second percentage) of sales for all sales generated from traffic originating from the affiliate site after the threshold of $100,000. Such a compensation plan may also specify that the second percentage rate may applied retroactively to compensate the affiliate according to the second percentage rate of the measure for the traffic to the Merchant Web site prior to reaching the first threshold quantity of the measure. Indeed, the merchant may compensate the affiliate at the rate of 5% for sales generated up to $100,000 and thereafter retroactively apply the second percentage of 7% to all sales (including those generated prior to reaching an aggregate sales figure of $100,000) from the affiliate once sales attributable to traffic originating from the affiliate site reaches $100,000. Alternatively or in addition to the second percentage (whether applied retroactive or not), the compensation plan may include a bonus to be awarded to the affiliate after the threshold quantity of the predetermined measure is reached. The predetermined measure, according to the present invention, is not limited to sales. For example, the measure forming the basis of the computed compensation due the associate may be based upon measures such as number of orders, number of new customers, number of returning customers and click throughs, for example.

The compensation plans, according to the present invention, may include one or more compensation plans in which the compensation due to the affiliate varies according to predefined product categories (books, music, database software, customer relationship management software, etc.). Such product categories may be used in concert with the above-described compensation plans to provide a rich panoply of resources on which to draw in defining compensation plans for the affiliate. For example, a compensation plan might specify that the affiliate is to be compensated on the basis of a fixed value (an amount of money or a non-monetary value such as travel miles, store credits and points redeemable for products and/or services for example) for each sale within a predetermined product category or on the basis of a fixed or variable percentage within each product category. The affiliate may choose, moreover, to be compensated in their preferred currency.

The compensation plan(s) selected by the affiliate may include a performance goal assigned to the affiliate by the merchant. The merchant may, according to further embodiments, periodically compare the affiliate's performance (as measured according to one of the predetermined measures, for example) against the performance goal assigned to the affiliate. In addition, the compensation plans may provide for any sub-affiliates that may be recruited by the affiliate. In this manner, the affiliate may be further compensated by the merchant based upon traffic to the merchant Web site originating from the sub-affiliate's Web site.

The compensation step may be carried out according to a pay calendar that is selectable by the merchant. To aid the merchant in managing their affiliates, the each affiliate may be made to belong to one of a plurality of groups of affiliates.

In turn, each of these affiliate pay groups may be assigned a pay calendar and the compensation due to each member of an affiliate pay groups may be paid out according to the assigned pay calendar.

Figure 2:
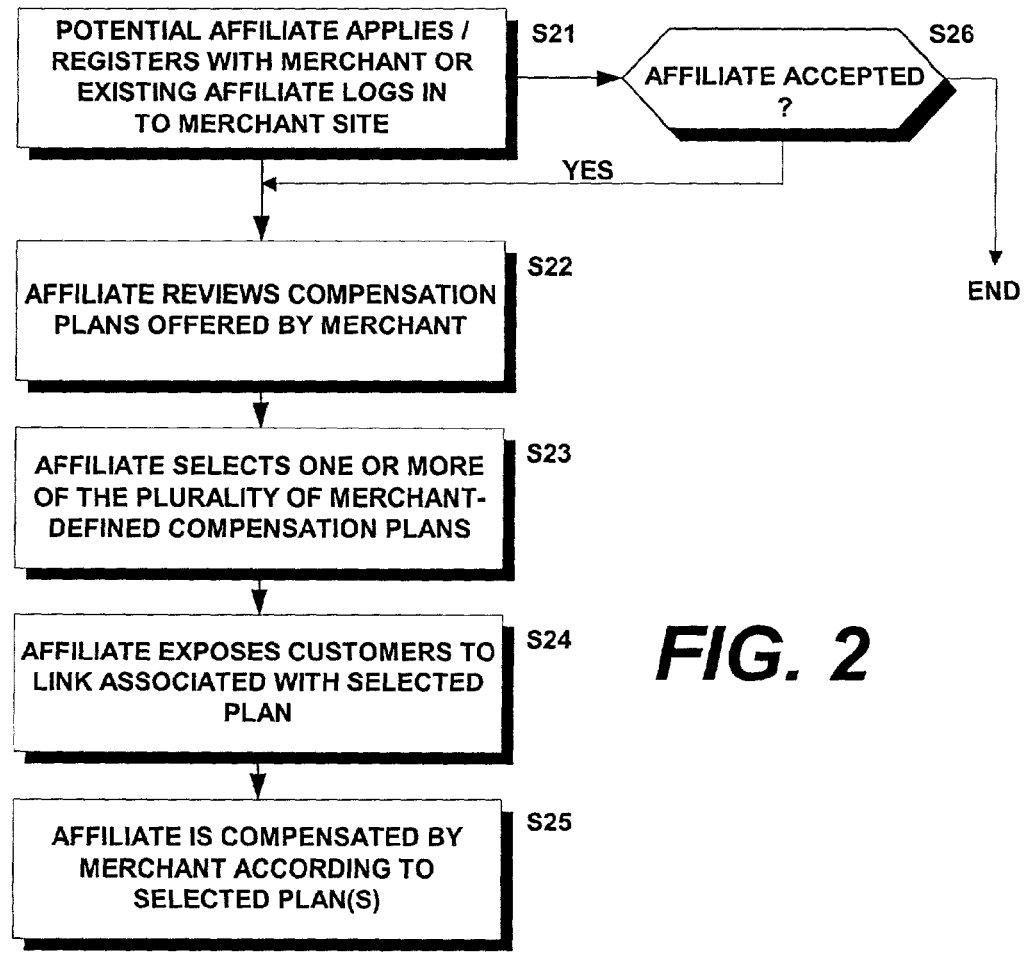
FIG. 2 is a flowchart of a method for an affiliate to earn compensation from a merchant for traffic to a merchant Web site that originates from an affiliate Web site.

FIG. 2 is a flowchart of an embodiment of a method for an affiliate to earn compensation from a merchant for traffic to a merchant Web site that originates from an affiliate Web site, according to another embodiment of the present invention. As shown therein, prior to an affiliate or potential affiliate viewing the compensation plans, the affiliate (or potential affiliate) must access the merchant's Web site. As shown at S21, the merchant may require a potential affiliate to complete an application, whereupon the merchant may accept or decline the potential affiliate based upon an evaluation of the completed application, as shown at S26. Alternatively, potential affiliates may simply complete a registration procedure, whereupon the potential affiliate is accepted as an affiliate of the merchant. During the application and registration process, the affiliate may be called upon to provide authentication and/or other (such as marketing, for example) information that may thereafter be used to authenticate the affiliate. This information also enables profiling the affiliates for future customized compensation plans based upon, for example, the traffic to the merchant Web site that originates from the affiliate Web site or the determined compensation. Existing affiliates may simply log in, after having provided proper authentication information. After logging in, registering or after having been accepted as an affiliate, step S22 calls for the affiliate to access a page on the merchant's site on which the compensation plans available to the affiliate are shown. The affiliate way then review each of these plans and, according to step S23, select one or more of the available compensation plans. The affiliate may then paste a link to the product and/or services covered by the selected compensation plan(s) on their own affiliate Web site (or otherwise provide means for directing traffic to the merchant site). Customers to the affiliate site, in this manner, are exposed to the link associated with the selected compensation plan, as called for by step S24. The affiliate may then be compensated by the merchant according to the terms and conditions set forth in the selected compensation plans, as called for in step S25.

It is customary for consumers and buyers of expensive goods to return several times to the merchant's Web site before committing to the purchase of the item of interest. Therefore, although a merchant benefits from the eventual sale, the affiliate may not so benefit as the customer may not have originated from the affiliate site immediately prior to committing to the purchase of the item of interest. Indeed, it is likely that, after only one or a few visits to the merchant site via the affiliate site, the customer proceeded directly to the merchant site, bypassing the affiliate site entirely. This would result in the affiliate being denied compensation for a sale to a customer that first originated from the affiliate site. To address this issue, the present invention provides for the traffic measuring step also including a step of measuring traffic to the merchant Web site that originates from a site other than the affiliate Web site but whose first visit to the merchant Web site originated from the affiliate Web site. This may readily be carried out by, for example, storing the necessary information in a cookie stored in the customer's computer.

To facilitate transitioning customers from the affiliate to the merchant site and vice versa, customer information may be shared between the affiliate and the merchant. For example, the customer information may be sufficient to enable the customer to execute a purchase request at the merchant web site, without further input from the customer. Such customer information may include, for example, customer authentication information (name, address and/or other demographic information, for example) and payment instrument information (such as credit card number, bank references, for example). It is to be noted that the present invention may readily be used in conjunction with mass affiliates that are managed by a third party, such as described at www.linkshare.com or www.immediation.com, to name a few representative affiliate management organizations.

Figure 3:
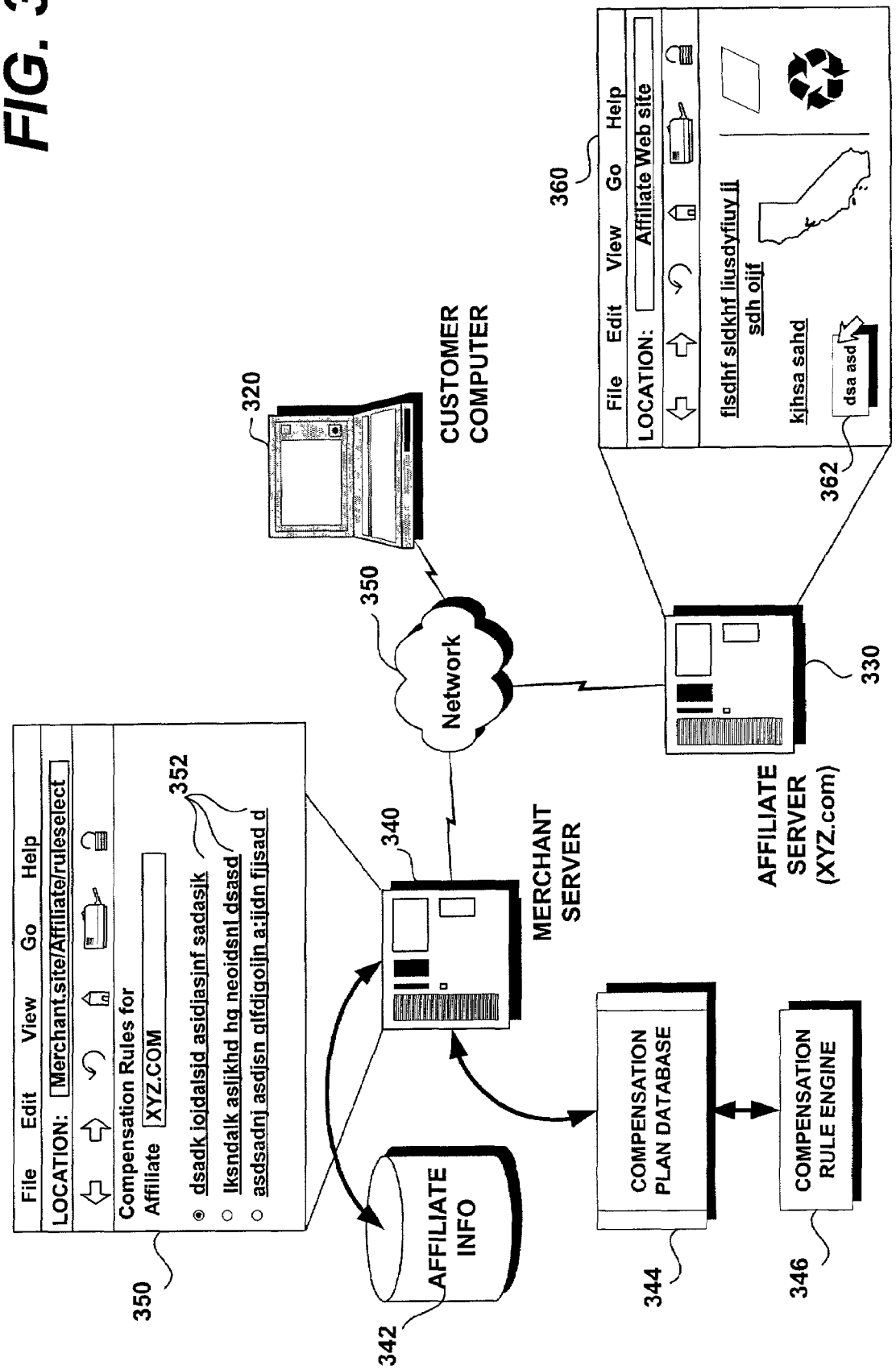
FIG. 3 is a block diagram of a network of computer systems suitable for carrying out the present invention.

FIG. 3 is a block diagram of a network suitable for carrying out the present invention. As shown therein, a merchant Web server 340, an affiliate Web server 330 and a customer computer 320 are coupled to a network 350 (including, for example, the Internet and/or other public or private networks). The merchant server 340 may also be coupled to a database 342, in which the merchant may store affiliate information requested or gathered from the affiliate. The merchant server 340 may also be coupled to a compensation plan database 344, in which the merchant may store the plurality of compensation plans available to its affiliates. A compensation plan engine 346 may access the compensation plan database 344 and the affiliate information database 342 to select which of the plurality of compensation plans stored in the database 344 should be exposed (i.e., made visible) to the affiliate. Advantageously, the compensation plan(s) 352 that are exposed to the affiliate on the merchant's Web site 350 may be tailored to the affiliate and/or a product or service offered by the merchant. The affiliate may view the full details of each of the compensation plans 352 at will, to facilitate the selection thereof. According to the present invention, each of the compensation plans is associated with one or more hypertext links 362 to enable a customer (the customer computer being shown at 320 in FIG. 3) to access the featured product and/or service on the merchant Web site 350. Such hypertext links 362 may be pasted onto the affiliate's Web site 360 to induce the customer to purchase the products and/or services featured through the merchant's Web site 350. Variations from that shown and described herein are possible. For example, the databases 342 and 344 may be integrated into a single database accessible by the merchant server 340.

Hardware Description

Figure 4:
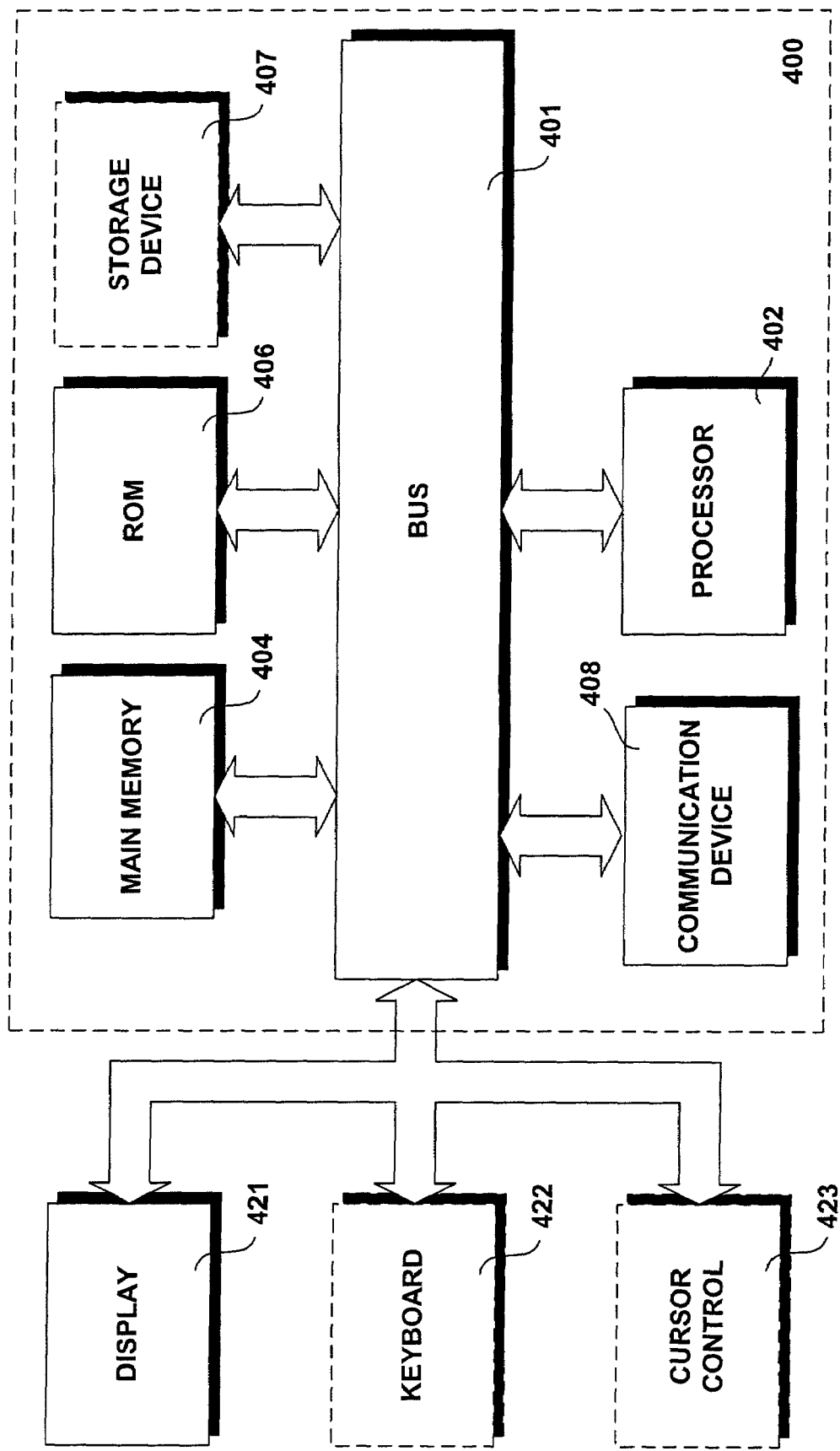
FIG. 4 is a block diagram of a computer with which the present invention may be practiced.

FIG. 4 illustrates a block diagram of a computing device 400 with which an embodiment of the present invention may be implemented. Computing device 400 includes a bus 401 or other communication mechanism for communicating information, and a processor 402 coupled with bus 401 for processing information. Computing device 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computing device 400 may also include a read only memory (ROM) and/or other static storage device 406 coupled to bus 401 for storing static information and instructions for processor 402. A data storage device 407, such as a magnetic disk or optical disk, may be coupled to bus 401 for storing information and instructions. A communication device 408, such as a modem or network (such as Ethernet, for example) card is also coupled to the bus 401 to provide access to a network, such as shown at 112 in FIG. 1.

The computing device 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device might be the user's own voice or cursor control 423, such as a mouse, a trackball, or cursor direction keys for communicating direction information and command selections to processor 402 and for controlling cursor movement on display 421.

The present invention is related to the use of computing device 400 configured to determine the compensation due an affiliate, as disclosed above. According to one embodiment, the processing may be carried out by one or more computing devices 400 in response to processor(s) 402 executing sequences of instructions contained in memory 404. Such instructions may be read into memory 404 from another computer-readable medium, such as data storage device 407 and/or from a remotely located server. Execution of the sequences of instructions contained in memory 404 causes processor(s) 402 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method for determining a compensation due an affiliate from a merchant for traffic to a merchant Web site that originates from an affiliate Web site, a computer, on behalf of the merchant, performing the steps of:
    defining, by the merchant, a plurality of different compensation plans, each of the plurality of compensation plans determining the compensation due to the affiliate at least in part according to measured traffic of at least one of new customers, returning customers and click-throughs to the merchant Web site from the affiliate Web site;
    receiving an application from a potential affiliate, the received application including sales and marketing information of the potential affiliate;
    evaluating the received application and defining a profile of the potential affiliate based upon the sales and marketing information in the received application;
    selecting which of the plurality of different compensation plans to expose to the potential affiliate based upon the defined profile of the potential affiliate, the selected ones of the plurality of compensation plans being fewer in number than the defined plurality of different compensation plans;
    exposing the selected ones of the plurality of compensation plans to the potential affiliate, the exposed compensation plans being tailored to at least one of the potential affiliate and a product or service offered by the merchant, as determined based upon the defined profile and the evaluation of the sales and marketing information in the received application;
    accepting a selection by the potential affiliate of at least one of the exposed compensation plans, the potential affiliate then becoming an affiliate, the accepting step being separate and distinct from the application receiving step, and
    measuring traffic to the merchant Web site that originates from the affiliate Web site and applying the measured traffic to the at least one compensation plan selected by the affiliate to determine the compensation due to the affiliate.

2. The method of claim 1, wherein the plurality of compensation plans includes a compensation plan in which the compensation due the affiliate varies according to a predetermined date interval.

3. The method of claim 1, wherein the plurality of compensation plans includes a compensation plan in which the affiliate is compensated according to a first percentage rate of a predetermined measure until a first threshold quantity of the measure is reached and thereafter the affiliate is compensated according to a second percentage rate of the predetermined measure.

4. The method of claim 3, wherein the second percentage rate is applied retroactively to compensate the affiliate according to the second percentage rate of the measure for the traffic to the Merchant Web site prior to reaching the first threshold quantity of the measure.

5. The method of claim 1, further including a step of defining a plurality of product categories and wherein the plurality of compensation plans includes a compensation plan in which the compensation due to the affiliate varies according to the defined product categories.

6. The method of claim 1, wherein the traffic to the merchant Web site is measured according to at least one predetermined measure, the at least one predetermined measure being selected from a group including generated revenue, number of orders, number of new customers, number of returning customers and click throughs.

7. The method of claim 6, wherein the compensation due to the affiliate is determined according to at least one of a fixed value and a percentage of the at least one predetermined measure.

8. The method of claim 7, wherein the percentage is one of fixed and variable.

9. The method of claim 1, wherein the compensating step compensates the affiliate in one of a currency preferred by the affiliate.

10. The method of claim 1, wherein the compensation due to the affiliate includes a bonus after a threshold quantity of a predetermined measure is reached.

11. The method of claim 1, wherein the compensation due the affiliate includes non-monetary credits, a magnitude of which is determined by the at least one selected compensation plans.

12. The method of claim 11, wherein the non-monetary credits are chosen from among a group including travel miles, store credits and points redeemable for products and/or services.

13. The method of claim 1, further including the steps of:
    assigning a performance goal to the affiliate, and
    periodically comparing a performance of the affiliate against the performance goal assigned to the affiliate.

14. The method of claim 13, wherein the performance of the affiliate is measured according to the traffic to the merchant Web site that originates from the affiliate Web site.

15. The method of claim 1, wherein the measuring step is carried out over a selectable interval that is independent of an accounting calendar.

16. The method of claim 1, further including a step of assigning at least one compensation plan to a sub-affiliate recruited by the affiliate, the affiliate being further compensated based upon traffic to the merchant Web site originating from a Web site of the sub-affiliate.

17. The method of claim 1, further including a step of paying the affiliate based upon the determined compensation, the paying step being carried out according to a pay calendar that is selectable by the merchant.

18. The method of claim 1, further including the steps of:
making the affiliate one of a plurality of members of a pay group;
assigning a pay calendar to the pay group, and
paying the plurality of members of the pay group according to the assigned pay calendar.

19. The method of claim 1, further including a step of profiling the affiliate for future customized compensation plans based upon the traffic to the merchant Web site that originates from the affiliate Web site or the determined compensation.

20. The method of claim 1, wherein the traffic measuring step also includes a step of measuring traffic to the merchant Web site that originates from a site other than the affiliate Web site but whose first visit to the merchant Web site originated from the affiliate Web site.

21. The method of claim 1, wherein further including a step of receiving customer information from the affiliate, the received customer information being sufficient for executing a customer purchase request at the merchant web site.

22. The method of claim 21, wherein the customer information includes customer authentication and payment instrument information.

23. The method of claim 1, further including a step of setting up at least one link to the merchant Web site on the affiliate Web site, the at least one link being associated with the at least one selected compensation plan selected by the affiliate.

24. The method of claim 1, wherein the defining step defines compensation plans that implement a sales strategy of the merchant.

25. The method of claim 1, further including the step of maintaining a plurality of mass affiliates compensated by compensation plans that differ from the defined plurality of compensation plans, the mass affiliates being managed by a third party.

26. A computer-implemented method for an affiliate to earn compensation from a merchant for traffic to a merchant Web site that originates from an affiliate Web site, a computer, on behalf of the affiliate, performing the steps of:
accessing the merchant Web site;
providing the merchant Web site with sales and marketing information requested by the merchant Web site to enable the merchant to define a profile of the affiliate;
reviewing, after having provided die merchant with the requested sales and marketing information, a plurality of different compensation plans exposed to the affiliate at the merchant Web site, each of the exposed plurality of different compensation plans being tailored to the affiliate based upon the sales and marketing information provided by the affiliate to the merchant and the defined profile and selecting at least one of the plurality of compensation plans, each of the compensation plans having a link to the merchant Web site associated therewith, the selecting step being separate and distinct from the sales and marketing information providing step;
providing at least one link to the merchant Web site on the affiliate Web site, the provided at least one link being associated with the selected at least one of die plurality of compensation plans, and
receiving compensation from the merchant according to die selected at least one of the plurality of compensation plans, each of the plurality of compensation plans determining the compensation due to the affiliate at least in part according to measured traffic of at least one of new customers, returning customers and click-throughs to the merchant Web site that originates from the at least one link on the affiliate Web site.

27. The method of claim 26, wherein the plurality of compensation plans includes a compensation plan in which the compensation received by the affiliate varies according to a predetermined date interval.

28. The method of claim 26, wherein the plurality of compensation plans includes a compensation plan in which the affiliate is compensated according to a first percentage rate of a predetermined measure until a first threshold quantity of the measure is reached and thereafter the affiliate is compensated according to a second percentage rate of the predetermined measure.

29. The method of claim 28, wherein the second percentage rate is applied retroactively to compensate the affiliate according to the second percentage rate of the measure for the traffic to the Merchant Web site prior to reaching the first threshold quantity of the measure.

30. The method of claim 26, further including a step of defining a plurality of product categories and wherein the plurality of compensation plans includes a compensation plan in which the compensation received by the affiliate varies according to the defined product categories.

31. The method of claim 26, wherein the traffic to the merchant Web site is measured according to at least one predetermined measure, the at least one predetermined measure being selected from a group including generated revenue, number of orders, number of new customers, number of returning customers and click throughs.

32. The method of claim 31, wherein the compensation received by the affiliate is determined according to at least one of a fixed value and a percentage of the at least one predetermined measure.

33. The method of claim 32, wherein the percentage is one of fixed and variable.

34. The method of claim 26, wherein the received compensation is in a currency preferred by the affiliate.

35. The method of claim 26, wherein the compensation received by the affiliate includes a bonus after a threshold quantity of a predetermined measure is reached.

36. The method of claim 26, wherein the compensation received by the affiliate includes non-monetary credits, a magnitude of which is determined by the at least one selected compensation plans.

37. The method of claim 36, wherein the non-monetary credits are chosen from among a group including travel miles, store credits and points redeemable for products and/or services.

38. The method of claim 26, further including a step of recruiting a sub-affiliate, the received compensation including compensation for traffic to the merchant Web site originating from a Web site of the sub-affiliate.

39. The method of claim 26, wherein the receiving step is carried out according to a pay calendar that is selectable by the merchant.

40. The method of claim 26, wherein the received compensation includes compensation for traffic to the merchant Web site that originates from a site other than the affiliate Web site but whose first visit to the merchant Web site originated from the affiliate Web site.

41. The method of claim 26, wherein further including a step of providing information on customers of the affiliate site to the merchant Web site, the provided customer information being sufficient for the merchant to execute a customer purchase request at the merchant web site.

42. The method of claim 41, wherein the customer information includes customer authentication and payment instrument information.

43. A computer system configured for determining a compensation due an affiliate from a merchant for traffic to a merchant Web site that originates from an affiliate Web site, comprising:
- at least one processor;
- at least one data storage device;
- a plurality of processes spawned by said at least one processor, the processes including processing logic for:
  - defining, by the merchant, a plurality of different compensation plans, each of the plurality of compensation plans determining the compensation due to the affiliate at least in part according to measured traffic of at least one of new customers, returning customers and click-throughs to the merchant Web site from the affiliate Web site;
  - receiving an application from a potential affiliate, the received application including sales and marketing information of the potential affiliate;
  - evaluating the received application and defining a profile of the potential affiliate based upon the sales and marketing information in the received application;
  - selecting which of the plurality of different compensation plans to expose to the potential affiliate based upon the defined profile of the potential affiliate, the selected ones of the plurality of compensation plans being fewer in number than the defined plurality of different compensation plans;
  - exposing the selected ones of the plurality of compensation plans to the potential affiliate, the exposed compensation plans being tailored to at least one of the potential affiliate and a product or service offered by the merchant, as determined based upon the defined profile and the evaluation of the sales and marketing information in the received application;
  - accepting a selection by the potential affiliate of at least one of the exposed compensation plans, the potential affiliate then becoming an affiliate, the accepting step being separate and distinct from the application receiving step, and
  - measuring traffic to the merchant Web site that originates from the affiliate Web site and applying the measured traffic to the at least one compensation plan selected by the affiliate to determine the compensation due to the affiliate.

44. The computer system of claim 43, wherein the plurality of compensation plans includes a compensation plan in which the compensation due the affiliate varies according to a predetermined date interval.

45. The computer system of claim 43, wherein the plurality of compensation plans includes a compensation plan in which the affiliate is compensated according to a first percentage rate of a predetermined measure until a first threshold quantity of the measure is reached and thereafter the affiliate is compensated according to a second percentage rate of the predetermined measure.

46. The computer system of claim 45, wherein the second percentage rate is applied retroactively to compensate the affiliate according to the second percentage rate of the measure for the traffic to the Merchant Web site prior to reaching the first threshold quantity of the measure.

47. The computer system of claim 43, further including a step of defining a plurality of product categories and wherein the plurality of compensation plans includes a compensation plan in which the compensation due to the affiliate varies according to the defined product categories.

48. The computer system of claim 43, wherein the traffic to the merchant Web site is measured according to at least one predetermined measure, the at least one predetermined measure being selected from a group including generated revenue, number of orders, number of new customers, number of returning customers and click throughs.

49. The computer system of claim 48, wherein the compensation due to the affiliate is determined according to at least one of a fixed value and a percentage of the at least one predetermined measure.

50. The computer system of claim 49, wherein the percentage is one of fixed and variable.

51. The computer system of claim 43, wherein the compensating step compensates the affiliate in one of a currency preferred by the affiliate.

52. The computer system of claim 43, wherein the compensation due to the affiliate includes a bonus after a threshold quantity of a predetermined measure is reached.

53. The computer system of claim 43, wherein the compensation due the affiliate includes non-monetary credits, a magnitude of which is determined by the at least one selected compensation plans.

54. The computer system of claim 53, wherein the non-monetary credits are chosen from among a group including travel miles, store credits and points redeemable for products and/or services.

55. The computer system of claim 43, further including the steps of:
- assigning a performance goal to the affiliate, and
- periodically comparing a performance of the affiliate against the performance goal assigned to the affiliate.

56. The computer system of claim 55, wherein the performance of the affiliate is measured according to the traffic to the merchant Web site that originates from the affiliate Web site.

57. The computer system of claim 43, wherein the measuring step is carried out over a selectable interval that is independent of an accounting calendar.

58. The computer system of claim 43, further including a step of assigning at least one compensation plan to a sub-affiliate recruited by the affiliate, the affiliate being further compensated based upon traffic to the merchant Web site originating from a Web site of the sub-affiliate.

59. The computer system of claim 43, further including a step of paying the affiliate based upon the determined compensation, the paying step being carried out according to a pay calendar that is selectable by the merchant.

60. The computer system of claim 43, further including the steps of:
- making the affiliate one of a plurality of members of a pay group;
- assigning a pay calendar to the pay group, and
- paying the plurality of members of the pay group according to the assigned pay calendar.

61. The computer system of claim 43, further including a step of profiling the affiliate for future customized compensation plans based upon the traffic to the merchant Web site that originates from the affiliate Web site or the determined compensation.

62. The computer system of claim 43, wherein the traffic measuring step also includes a step of measuring traffic to the merchant Web site that originates from a site other than the affiliate Web site but whose first visit to the merchant Web site originated from the affiliate Web site.

63. The computer system of claim 43, wherein further including a step of receiving customer information from the affiliate, the received customer information being sufficient for executing a customer purchase request at the merchant web site.

64. The computer system of claim 63, wherein the customer information includes customer authentication and payment instrument information.

65. The computer system of claim 43, further including a step of setting up at least one link to the merchant Web site on the affiliate Web site, the at least one link being associated with the at least one selected compensation plan selected by the affiliate.

66. The computer system of claim 43, wherein the defining step defines compensation plans that implement a sales strategy of the merchant.

67. The computer system of claim 43, further including the step of maintaining a plurality of mass affiliates compensated by compensation plans that differ from the defined plurality of compensation plans, the mass affiliates being managed by a third party.

68. The method of claim 1, wherein the information requested and received from the affiliate includes at least one of affiliate sales and affiliate marketing information.

69. The computer-implemented method of claim 26, wherein the information provided to the merchant Web site includes at least one of affiliate sales and affiliate marketing information.

70. The computer system of claim 43, wherein the information requested aid received from the affiliate includes at least one of affiliate sales and affiliate marketing information.

* * * * *

UNITED STATES PATENT AND TRADEMARK OFFICE
CERTIFICATE OF CORRECTION

PATENT NO. : 7,584,118 B1 Page 1 of 1
APPLICATION NO. : 09/888850
DATED : September 1, 2009
INVENTOR(S) : Bellare et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1450 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,584,118 B1 | Page 1 of 1 |
| APPLICATION NO. | : 09/888850 | |
| DATED | : September 1, 2009 | |
| INVENTOR(S) | : Kiran Bellare et al. | |

It is certified that error appears in the above-identified patent and that said Letters Patent is hereby corrected as shown below:

In column 7, line 31, delete "way" and insert -- may --, therefor.

In column 11, line 49, in claim 26, delete "die" and insert -- the --, therefor.

In column 11, line 63, in claim 26, delete "die" and insert -- the --, therefor.

In column 11, line 66, in claim 26, delete "die" and insert -- the --, therefor.

In column 16, line 14, in claim 70, delete "aid" and insert -- and --, therefor.

Signed and Sealed this

Twenty-third Day of November, 2010

David J. Kappos
*Director of the United States Patent and Trademark Office*